June 22, 1926.
R. SEAFERD
TIRE REMOVING TOOL
Filed March 24, 1922
1,589,989
2 Sheets-Sheet 2
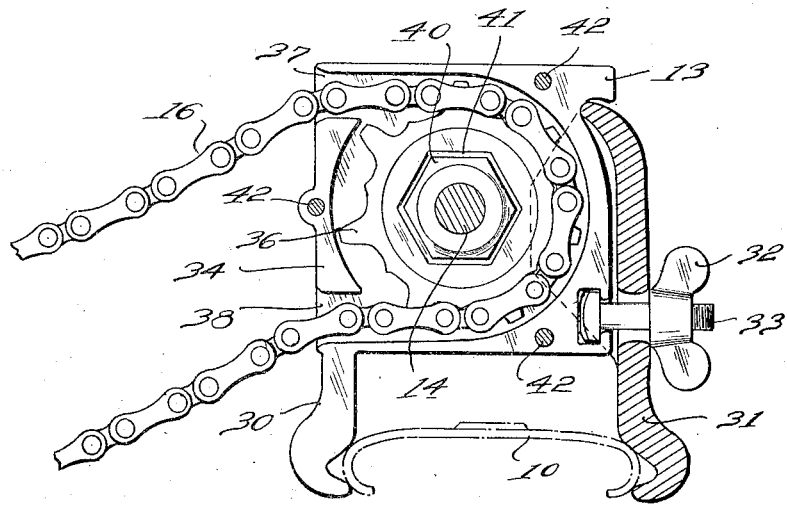
Fig.-4
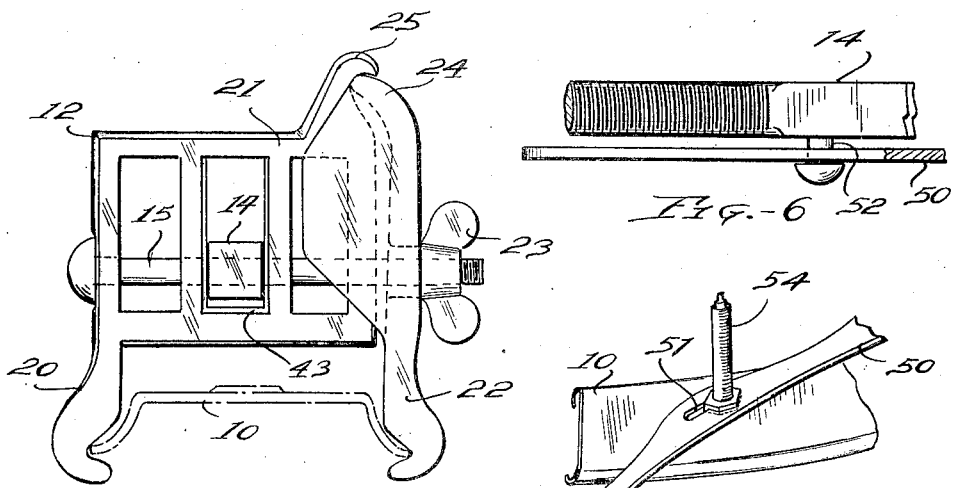
Fig.-5
Fig.-6
Fig.-7
INVENTOR
Robert Seaferd,
By Dale J Macklin
ATTORNEYS Patented June 22, 1926.

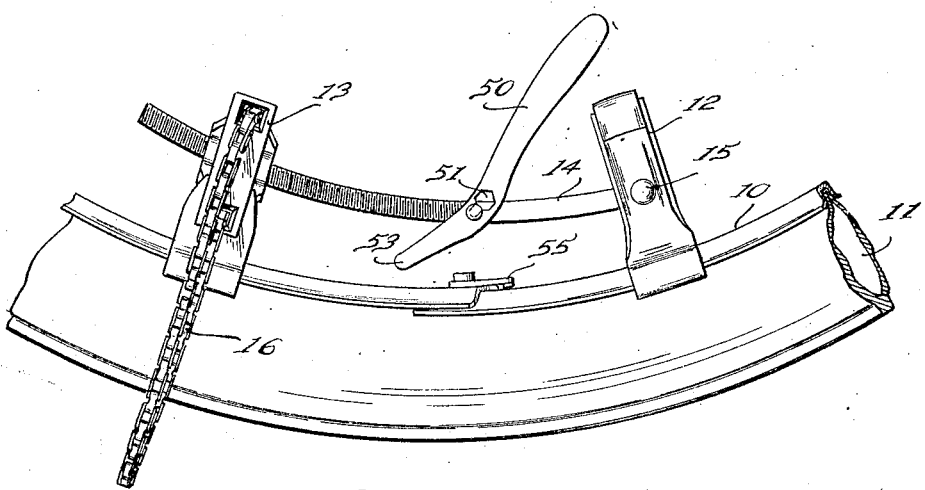
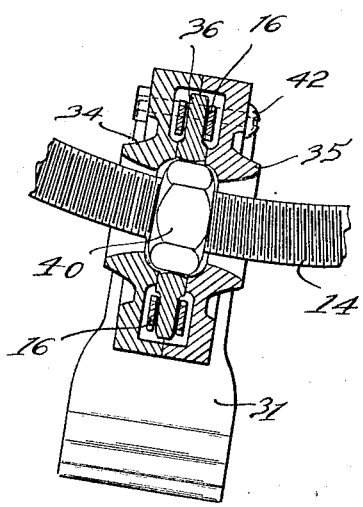 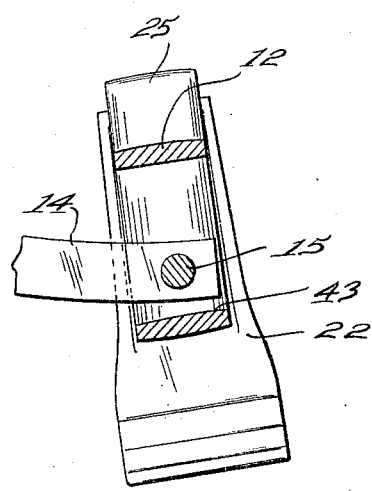

1,589,989

UNITED STATES PATENT OFFICE.

ROBERT SEAFERD, OF CLEVELAND, OHIO.

TIRE-REMOVING TOOL.

Application filed March 24, 1922. Serial No. 546,281.

This invention relates to tools which are adapted for use in opening and closing collapsible rims for facilitating the changing of automobile tires.

The usual procedure in removing a tire from a rim is to lay the rim flat upon the ground or floor, and then to use suitable tools for disengaging the abutting ends of the rim. Similarly, in placing the tire on the rim the reverse procedure is followed, but usually considerable difficulty is experienced in expanding the rim, not only on account of the inherent resiliency of the rim, but also because of the fact, that when the rim is on the ground, the operator is placed at a disadvantageous position for using the rim expanding tool.

One of the objects of my invention, therefore, is the provision of a tool which enables an operator to open or close a collapsible rim without requiring him to assume an awkward position for applying power to the rim tool. In this connection, my invention provides for a tool which is quite simple in construction, light in weight and capable of being readily attached to an automobile rim.

The means for carrying out my invention is embodied in a pair of clamps adapted to primarily engage an automobile rim on either side of the joint thereof, and to this end, I employ a screw and nut couple, for causing relative movement between the clamps, whereby the ends of the rim may be drawn in either direction as desired. For operating the screw and nut couple, I prefer to employ an endless chain which has sufficient length for enabling an operator to stand in a comfortable position, while operating the tool, and therefore to apply maximum power at a point remote from the tool.

The means for carrying out my invention will be more fully set forth in connection with the description, which pertains to the accompanying drawings. The essential features of my invention are summarized in the claims.

In the drawings, Fig. 1 is a perspective view of a tool constructed according to my invention and showing the manner of attachment to a rim; Fig. 2 is a transverse section taken through one of the clamps and showing the screw and nut couple; Fig. 3 is a similar section taken through the other clamp; Fig. 4 is a section through the clamp adjacent the operating end of the tool; Fig. 5 is an end view of the clamp shown in section in Fig. 3; Fig. 6 is a plan view of a portion of an aligning lever adapted for use with my invention; and Fig. 7 is a perspective view illustrating one use for the lever shown in Fig. 6.

In the various figures I have shown a collapsible automobile rim 10 with a tire 11 secured thereto. The tool embodying my invention is illustrated as having a pair of clamps 12, and 13, which are shown in Fig. 1 as engaging the rim on either side of the joint thereof. The preferred means for causing relative movement between the clamps is embodied in a spindle 14, which may be pivoted at 15 to a clamp 12, and be permitted to extend through the clamp 13. The spindle cooperates with a revoluble element housed within the clamp 13, to form a screw and nut couple, which is adapted to be controlled at a point remote from the clamp, as by a hand chain 16.

For purposes of description, the clamp 12 will be designated the stationary clamp and the clamp 13 movable. The stationary clamp, as shown in Fig. 5, preferably embodies a jaw 20 which is integral with a laterally extending portion 21, which portion supports a member 15 upon which the spindle 14 is pivoted. This member may extend entirely through the portion 21 and may serve to support a movable jaw 22. The free end of the member may be threaded for receiving a wing nut 23. The movable jaw is slidable on the member 15 for enabling the clamp to be attached to practically all sizes of rims and for this purpose, I have shown the free end 24 of the jaw 22 in engagement with a recessed portion 25 on the portion 21. The free end, then, may be pivoted about the recessed portion and held in engagement with the flange of a rim, by means of the wing nut 23.

The movable clamp 13 is formed somewhat similar to the stationary clamp 12, in that a stationary jaw 30 is rigidly secured to a laterally extending portion, and is adapted to receive a movable jaw 31, which is adjustable by a wing nut 32 on a threaded member 33. The stationary clamp, however, preferably comprises two recessed portions 34 and 35, which are shaped to receive a sprocket wheel 36, and the chain 16. Suitable openings 37 and 38 permit the chain to pass through the movable clamp. Similarly, the recessed portions 34 and 35 are shaped to receive a nut 40, which is in threaded engagement with the spindle 14, and is complementary to the aperture 41 at the center of the sprocket wheel. This spindle and nut forms a screw and nut couple for advancing the clamp 13 along the spindle, and for causing relative motion between the ends of the rim 10. The recessed portion adjacent the nut is such as to permit slight flexible movement for enabling the spindle and nut to be tipped and thereby adjusted according to the diameter of the rim to which the clamps are to be attached. These recessed portions are also preferably divided on a line passing through the central portion thereof, and are held together by securing members 42.

The spindle 14 is preferably curved to prevent a binding action between the nut and clamp 13, as the clamp moves along the spindle. In making the spindle, I prefer to square the end adjacent the clamp 12, and accordingly I provide a rectangular opening 43 in which the squared portion extends, thus providing bearing surfaces which resist the tendency of the spindle to turn as the sprocket wheel is rotated.

To bring the ends of the rim into alignment after the tool has been used for expanding the rim, I may provide a lever 50 which has a slot 51 for receiving a headed stud 52, (Fig. 6) carried by the spindle 14. The working end 53 of the lever may be shaped to engage one of the rim ends, for forcing it inwardly, and for holding it until the chain is slackened, thus allowing the inherent resiliency in the rim to hold the ends in abutting engagement. Similarly, if it is desired to open the rim, one end may be forced inwardly and thus held until the chain is slackened, thus allowing the other end to pass over the one so held. This lever may have the slot 51 shaped to engage the usual clamping nut carried by the stem 54, as illustrated in Fig. 7.

Assuming that the clamps 12 and 13 are attached to the rim 10 which is about to be closed, as illustrated in Fig. 1, then the operator draws the chain 16 through the slots 37 and 38 in such direction, as to cause the clamp 13 to move along the spindle 14 and away from the clamp 12. As soon as the clamp 13 is advanced along the spindle 14 until the ends of the rim are opposite each other, then the operator brings the lever 50 into engagement with the stud 52, (Fig. 6) and operates the lever to press the ends into alignment. Then while the ends are so held, the chain is slackened, thus allowing the inherent resiliency in the rim to hold the ends in abutting engagement. The rims may then be locked by the usual locking lever 55.

When it is desired to open the rim the chain is turned in such direction as to expand the rim a slight amount. Then one end of the rim is forced downwardly, whereupon the chain is operated in the reverse direction, thus allowing the other end of the rim to pass over the depressed end.

While I have explained the operation of a tool constructed according to my invention in connection with the hand operable lever 50, I have found that the tool may be so constructed that the ends of the rim automatically snap into position, as soon as one of the ends is moved over the other. This result may be attained by making the point of pivotal connection 15 closer to the rim, than the point of engagement between the spindle and clamp 13. This tends to press one end of the rim into engagement with the other during the expanding operation, thus enabling the inherent resiliency in the rim to snap the ends together as soon as one end is drawn across the other. Accordingly, under such conditions, the chain need not be slackened when the rim is being expanded for closing purposes. However, in opening the rim, it is necessary to use the lever for pressing one end inwardly, as heretofore explained.

In view of the foregoing description, it will be seen that a tool constructed in accordance with my invention enables a collapsible rim to be readily opened or closed while the operator assumes a natural position, even though the rim lies flat on the ground, or other supporting surface. The arrangement of the screw and nut couple for causing relative movement between the clamps provides a simple and effective mechanism, which is comparatively cheap to manufacture and durable in use. Further advantages are that power may be applied with comparatively little energy, and that the point of application of power is such as to be convenient for effecting quick results.

I claim:—

In a tire removing tool, the combination of a pair of clamps each provided with means to engage a rim, a threaded shaft pivotally mounted on one of the clamps and extending through the other, said other clamp having a central recess with flaring openings on opposite sides thereof, a nut on the shaft located in the recess having an angular exterior and adapted to wobble in said recess, a sprocket wheel mounted within the clamp carrying the nut in a cavity therein and having an annular interior opening loosely engaging the nut, and a chain on the sprocket wheel leading to the exterior of the clamp which carries the nut.

In testimony whereof, I hereunto affix my signature.

ROBERT SEAFERD.